(12) United States Patent
Smith et al.

(10) Patent No.: US 11,803,501 B2
(45) Date of Patent: Oct. 31, 2023

(54) ROUTING ASSIGNMENTS BASED ON ERROR CORRECTION CAPABILITIES

(71) Applicant: Micron Technology, Inc., Boise, ID (US)

(72) Inventors: Scott E. Smith, Plano, TX (US); Randy Brian Drake, Meridian, ID (US); Brian Ladner, Fairview, TX (US); Thanh Kim Mai, Allen, TX (US); Sujeet Ayyapureddi, Boise, ID (US); Matthew Alan Prather, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 142 days.

(21) Appl. No.: 17/505,122

(22) Filed: Oct. 19, 2021

(65) Prior Publication Data

US 2023/0121163 A1    Apr. 20, 2023

(51) Int. Cl.
*G06F 13/40* (2006.01)
*G06F 11/10* (2006.01)
*G06F 13/16* (2006.01)

(52) U.S. Cl.
CPC ...... *G06F 13/4027* (2013.01); *G06F 11/1076* (2013.01); *G06F 13/1668* (2013.01)

(58) Field of Classification Search
CPC ............. G06F 13/4027; G06F 11/1076; G06F 13/1668
See application file for complete search history.

(56) References Cited

U.S. PATENT DOCUMENTS

| | | | |
|---|---|---|---|
| 11,494,319 B1 * | 11/2022 | Kim | G06F 11/1068 |
| 2017/0060789 A1 * | 3/2017 | Noda | G11C 7/1069 |
| 2018/0203761 A1 * | 7/2018 | Halbert | G11C 29/4401 |
| 2020/0219580 A1 * | 7/2020 | Khan | G11C 29/44 |
| 2021/0240566 A1 * | 8/2021 | Kedia | G06F 11/1048 |
| 2021/0359704 A1 * | 11/2021 | Chen | G06F 11/1004 |

* cited by examiner

*Primary Examiner* — Steven G Snyder
*Assistant Examiner* — Christopher A Daley
(74) *Attorney, Agent, or Firm* — Fletcher Yoder, P.C.

(57) ABSTRACT

The systems and methods described herein relate to a bi-directional data path (DQ) symbol map generated based on error correction operations. A device may include sub-wordline drivers and bi-directional data paths (DQs) that couple between the sub-wordline drivers and input/output (I/O) interface circuitry based on assignments indicated by the DQ symbol map. The assignments may be generated based on error correction operations performed on data of the memory bank. In particular, the DQ symbol map may be generated to avoid some conditions that, if occurring, may render one or more data errors uncorrectable. These systems and methods may reduce a likelihood of a data error associated with a DQ being uncorrectable.

20 Claims, 11 Drawing Sheets

ROUTING ASSIGNMENTS BASED ON ERROR CORRECTION CAPABILITIES

BACKGROUND

The present disclosure relates generally to memory device error correction and, more particularly, to systems and methods for reducing a likelihood of uncorrectable memory errors occurring in a memory device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, a computing system may include a device that, in operation, communicates information via electrical signals. For example, a computing system may include a processor communicatively coupled to a memory device, such as a dynamic random-access memory (DRAM) device disposed on a dual in-line memory module (DIMM). In this manner, the processor may communicate with the memory device, such as to retrieve executable instructions, retrieve data to be processed by the processor, and/or store data output from the processor.

When exchanging data between memory and the processor, data output from the memory may include one or more errors. The errors may result from a memory defect. Sometimes one memory defect can cause multiple errors. As memory densities increase and feature sizes decrease, memory defects may become more prevalent. Furthermore, as relatively large-scale computing systems that use large amounts of high-density memory increase in scale, the opportunity for memory defects may increase as well. For example, a larger population of memory operating simultaneously may increase an opportunity for memory defects. To correct a data error, like errors from a memory defect, the processor may perform error correction operations. Sometimes an error may be uncorrectable by the processor, such as when an error occurs that the error correction operations are unable to fix. Systems and methods that reduce a likelihood of an uncorrectable error occurring may be beneficial.

BRIEF DESCRIPTION OF THE DRAWINGS

Various aspects of this disclosure may better be understood upon reading the following detailed description and upon reference to the drawings in which.

DETAILED DESCRIPTION

Figure 1:
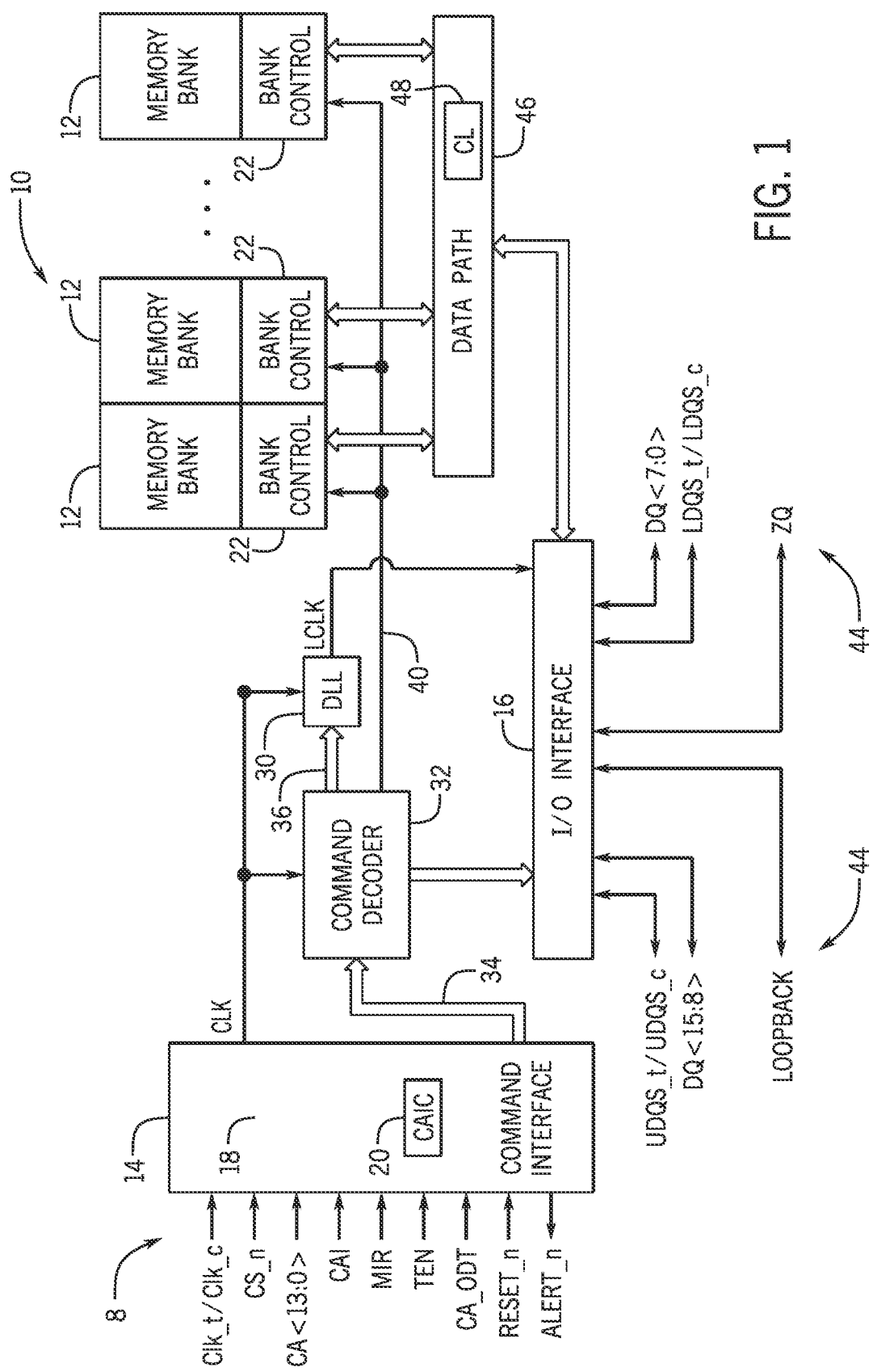
FIG. 1 is a block diagram of a memory device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, a computing system may include devices that communicate information via electrical signals when performing an operation. For example, electronic devices in a computing system may include a processor communicatively coupled to a memory device. In this manner, the processor may communicate with the memory device to retrieve executable instructions, retrieve data to be processed by the processor, store data output from the processor, or the like.

The memory may include or develop one or more memory defects. A defect may result from degradation or performance over time, from manufacturing, or the like. For example, as memory densities increase and feature sizes decrease, memory defects may become more prevalent. Memory defects may increasingly be an issue for systems that use simultaneously operating memories since the simultaneous operation may increase a likelihood of performance-based memory defects. For example, large-scale computing systems, distributed computing systems, remote servers, or the like may use large amounts of high-density memory, and thus be more likely to have computing or service-providing operations impacted by the memory defects.

Error correction code (ECC) may be used to correct data errors. Many correction algorithms organize the data as symbols. Each symbol may include one or more bits and when an error occurs in one or more bits within a single symbol, the algorithm may correct the whole symbol. Due to limitations in the correction algorithm, some data errors may be uncorrectable with ECC when one or more non-correction conditions occur. For example, one correction condition may specify that data errors that occur in multiple symbols must belong to specific groupings of symbols to be correctible. For example, if there are 8 symbols, the correction condition may specify that a pair of symbols with an error must be (Symbols A and B) or (Symbols C and D) or (Symbols E and F) or (Symbols G and H). Because of these types of specifications, systems and methods that reduce the likelihood of an uncorrectable error condition occurring may be beneficial.

Dynamic random access memories (DRAMs) may organize their data by data paths (DQs). For example, in a Double Date Rate 4 (DDR4) DRAM, each DQ may produce 8 bits of data on each read access. For this example, each DQ may be equated to a Symbol. DQ0 corresponds to Symbol A, DQ1 corresponds to Symbol B, and so on. It should be understood that there are many ways to organize the data into Symbols and this assignment is one example. Some Symbols may include one or more DQs. Also, depending on the correction scheme, the number of bits in each symbol definition might vary, and thus may include greater or fewer than 8 bits.

This disclosure relates to systems and methods that prevent or reduce a likelihood of uncorrectable data errors. A DQ symbol map may indicate assignments of each data path symbol to one or more portions of memory, such as an assignment that associates one or more data path symbols to one or more sub-wordline drivers (SWL drivers). To reduce a likelihood of uncorrectable data errors, the DQ symbol map may be generated to avoid or reduce occurrence of the non-correction conditions. The non-correction conditions may be avoided at least in part by using isolation systems and methods. These isolation systems and methods may include bank activation-based isolation, column select-based isolation, row select-based isolation, data arrangement-based isolation, or a combination thereof.

The DQ symbol map may be hard programmed into the memory device during manufacturing. Sometimes, communication and/or control circuitry of the memory device may reference the DQ symbol map when transmitting data to and from the memory. When referencing the DQ symbol map generated based on the non-correction conditions, the communication and/or control circuitry may write data into the memory with consideration for the non-correction conditions, and avoidance thereof.

In some embodiments, the memory device may include switching logic circuitry. The switching logic circuitry may couple memory banks to input/output circuitry and may include switching logic, multiplexing circuitry, or other suitable programmable routing to program the assignments indicated by the DQ symbol map. In some cases, the switching logic circuitry configures the switching logic, the multiplexing circuitry, or the other suitable programmable routing in response to system operation, such as in response to which memory bank is activated, to program different data paths to the memory bank.

Systems and methods that handle data based on the DQ symbol map generated with consideration for the non-correction conditions described herein may avoid or reduce a likelihood of uncorrectable data errors of a respective memory bank from occurring. When fewer uncorrectable errors occur, memory bank operation may become more reliable. Thus, memory device operation may improve overall based on how the reliability of the memory bank may increase when using the systems and methods described herein.

Turning now to the figures, FIG. 1 is a simplified block diagram illustrating certain features of a memory device 10. Specifically, the block diagram of FIG. 1 is a functional block diagram illustrating certain functionality of the memory device 10. In accordance with one embodiment, the memory device 10 may be a double data rate type five synchronous dynamic random access memory (DDR5 SDRAM) device. Various features of DDR5 SDRAM may permit reduced power consumption, more bandwidth, and more storage capacity compared to prior generations of DDR SDRAM.

The memory device 10, may include a number of memory banks 12. The memory banks 12 may be DDR5 SDRAM memory banks, for instance. The memory banks 12 may be provided on one or more chips (e.g., SDRAM chips) that are arranged on dual inline memory modules (DIMMs). Each DIMM may include a number of SDRAM memory chips (e.g., ×8 or ×16 memory chips), as will be appreciated. Each SDRAM memory chip may include one or more memory banks 12. The memory device 10 represents a portion of a single memory chip (e.g., SDRAM chip) having a number of memory banks 12. For DDR5, the memory banks 12 may be further arranged to form bank groups. For instance, for an 8 gigabit (Gb) DDR5 SDRAM, the memory chip may include 16 memory banks 12, arranged into 8 bank groups, each bank group including 2 memory banks. For a 16 Gb DDR5 SDRAM, the memory chip may include 32 memory banks 12, arranged into 8 bank groups, each bank group including 4 memory banks, for instance. Various other configurations, organization and sizes of the memory banks 12 on the memory device 10 may be utilized depending on the application and design of the overall system.

The memory device 10 may include a command interface 14 and an input/output (I/O) interface 16 configured to exchange (e.g., receive and transmit) signals with external devices. The command interface 14 is configured to provide a number of signals (e.g., signals 8 from an external device (not depicted), such as a processor or controller. The processor or controller may provide various signals 8 to the memory device 10 to facilitate the transmission and receipt of data to be written to or read from the memory device 10.

As will be appreciated, the command interface 14 may include a number of circuits, such as a clock input circuit 18 and a command address input circuit 20, for instance, to permit proper handling of the signals 8. The command interface 14 may receive one or more clock signals from an external device. Generally, double data rate (DDR) memory utilizes a differential pair of system clock signals, referred to as the true clock signal (Clk_t) and the complementary clock signal (Clk_c). The positive clock edge for DDR refers to the point where the rising true clock signal (Clk_t) crosses the falling complementary clock signal (Clk_c), while the negative clock edge indicates that transition of the falling true clock signal (Clk_t) and the rising of the complementary clock signal (Clk_c). Commands (e.g., read command, write command, refresh command) are typically entered on the positive edges of the clock signal and data is transmitted or received on both the positive and negative clock edges.

The clock input circuit 18 receives the true clock signal (Clk_t) and the complementary clock signal (Clk_c) and generates an internal clock signal (CLK). The internal clock signal (CLK) is supplied to an internal clock generator 30, such as a delay locked loop (DLL) circuit. The internal clock generator 30 generates a phase controlled internal locked clock signal (LCLK) based on the received internal clock signal (CLK). The phase controlled internal locked clock signal (LCLK) is supplied to the I/O interface 16, for instance, and is used as a timing signal for determining an output timing of read data.

The internal clock signal (CLK) may also be provided to various other components within the memory device 10 and may be used to generate various additional internal clock signals. For instance, the internal clock signal (CLK) may be provided to a command decoder 32. The command decoder 32 may receive command signals from the command bus 34 and may decode the command signals to provide various internal commands. For instance, the command decoder 32 may provide command signals to the internal clock generator 30 over the bus 36 to coordinate generation of the phase controlled internal locked clock signal (LCLK). The phase controlled internal locked clock signal (LCLK) may be used to clock data through the I/O interface 16, for instance.

The command decoder 32 may decode commands, such as read commands, write commands, mode-register set commands, activate commands, or the like, and provide access to a particular memory bank 12 corresponding to the command via the bus path 40. As will be appreciated, the memory device 10 may include various other decoders, such as row decoders and column decoders, to facilitate access to the memory banks 12. In one embodiment, each memory bank 12 includes or is associated with a bank control block 22 which provides the necessary decoding (e.g., row decoder and column decoder), as well as other operations, such as timing control and data control, to facilitate the execution of commands to and from the memory banks 12. Collectively, the memory banks 12 and the bank control blocks 22 may be referred to as a memory array.

The memory device 10 executes operations, such as read commands and write commands, based on the command/address signals received from an external device, such as a processor. In one embodiment, the command/address bus may be a 14-bit bus to accommodate the command/address signals (CA<13:0>). The command/address signals are clocked to the command interface 14 using the clock signals (Clk_t and Clk_c). The command interface may include a command address input circuit 20 which is configured to receive and transmit the commands to provide access to the memory banks 12, through the command decoder 32, for instance. In addition, the command interface 14 may receive a chip select signal (CS_n). The CS_n signal causes the memory device 10 to process commands on the incoming CA<13:0> bus. Access to specific memory banks 12 within the memory device 10 is encoded on the CA<13:0> bus with the commands.

In addition, the command interface 14 may be configured to receive a number of other command signals. For instance, a command/address on-die termination (CA_ODT) signal may be provided to facilitate proper impedance matching within the memory device 10. A reset command (RESE_n) may be used to reset the command interface 14, status registers, state machines and the like, during power-up instance. The command interface 14 may also receive a command/address invert (CAI) signal which may be provided to invert the state of command/address signals (CA<13:0>) on the command/address bus, for instance, depending on the command/address routing for the particular memory device 10. A mirror (MIR) signal may also be provided to facilitate a mirror function. The MIR signal may be used to multiplex signals so that they may be swapped for enabling certain routing of signals to the memory device 10, based on the configuration of multiple memory devices in a particular application. Various signals to facilitate testing of the memory device 10, such as the test enable (TEN) signal, may be provided, as well. For instance, the TEN signal may be used to place the memory device 10 into a test mode for connectivity testing.

The command interface 14 may also be used to provide an alert signal (ALERT_n) to the system processor or controller for certain errors that may be detected. For instance, an alert signal (ALERT_n) may be transmitted from the memory device 10 if a cyclic redundancy check (CRC) error is detected. Other alert signals may also be generated. Further, the bus and pin for transmitting the alert signal (ALERT_n) from the memory device 10 may be used as an input pin during certain operations, such as the connectivity test mode executed using the TEN signal, as described above.

Data may be sent to and from the memory device 10, utilizing the command and clocking signals discussed above, by transmitting and receiving data signals 44 through the I/O interface 16. More specifically, the data may be sent to or retrieved from the memory banks 12 over the data path circuitry 46, which includes a plurality of bi-directional data buses. Data I/O signals, generally referred to as DQ signals, are generally transmitted and received in one or more bi-directional data busses. For certain memory devices, such as a DDR5 SDRAM memory device, the I/O signals may be divided into upper and lower bytes. For instance, for a ×16 memory device, the I/O signals may be divided into upper and lower I/O signals (e.g., DQ<15:8> and DQ<7:0>) corresponding to upper and lower bytes of the data signals, for instance.

To permit higher data rates within the memory device 10, certain memory devices, such as DDR memory devices may utilize data strobe signals, generally referred to as DQS signals. The DQS signals are driven by the external processor or controller sending the data (e.g., for a write command) or by the memory device 10 (e.g., for a read command). For read commands, the DQS signals are effectively additional data output (DQ) signals with a predetermined pattern. For write commands, the DQS signals are used as clock signals to capture the corresponding input data. As with the clock signals (Clk_t and Clk_c), the data strobe (DQS) signals may be provided as a differential pair of data strobe signals (DQS_t and DQS_c) to provide differential pair signaling during reads and writes. For certain memory devices, such as a DDR5 SDRAM memory device, the differential pairs of DQS signals may be divided into upper and lower data strobe signals (e.g., UDQS_t and UDQS_c; LDQS_t and LDQS_c) corresponding to upper and lower bytes of data sent to and from the memory device 10, for instance.

An impedance (ZQ) calibration signal may also be provided to the memory device 10 through the I/O interface 16. The ZQ calibration signal may be provided to a reference pin and used to tune output drivers and on-die termination (ODT) values by adjusting pull-up and pull-down resistors of the memory device 10 across changes in process, voltage and temperature (PVT) values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/VSS external to the memory device 10. This resistor acts as a reference for adjusting internal ODT and drive strength of the I/O pins.

In addition, a loopback signal (LOOPBACK) may be provided to the memory device 10 through the I/O interface 16. The loopback signal may be used during a test or debugging phase to set the memory device 10 into a mode where signals are looped back through the memory device 10 through the same pin. For instance, the loopback signal may be used to set the memory device 10 to test the data output of the memory device 10. Loopback may include both a data and a strobe, or possibly a data pin to provide the data and/or the strobe. This is generally intended to be used to monitor the data captured by the memory device 10 at the I/O interface 16.

Various other components such as power supply circuits (for receiving external VDD and VSS signals), mode registers (to define various modes of programmable operations and configurations), read/write amplifiers (to amplify signals during read/write operations), temperature sensors (for sensing temperatures of the memory device 10), etc., may also be incorporated into the memory device 10. Accordingly, it should be understood that the block diagram of FIG. 1 is only provided to highlight certain functional features of the memory device 10 to aid in the subsequent detailed description.

In some embodiments, the memory device 10 may be disposed in (physically integrated into or otherwise connected to) a host device or otherwise coupled to a host device. The host device may include any one of a desktop computer, laptop computer, pager, cellular phone, personal organizer, portable audio player, control circuit, camera, or the like. The host device may also be a network node, such as a router, a server, or a client (e.g., one of the previously-described types of computers). The host device may be some other sort of electronic device, such as a copier, a scanner, a printer, a game console, a television, a set-top video distribution or recording system, a cable box, a personal digital media player, a factory automation system, an automotive computer system, a medical device, or the like. The terms used to describe these various examples of systems, like many of the other terms used herein, may share some referents and, as such, should not be construed narrowly in virtue of the other items listed.

Thus, the host device may generally be a processor-based device, which may include a processor, such as a microprocessor, that controls the processing of system functions and requests in the host device. Further, any host processor may include multiple processors that share system control. The host processor may be coupled directly or indirectly to additional system elements of the host device, such that the host processor controls the operation of the host device by executing instructions that may be stored within the host device or external to the host device.

As discussed above, data may be written to and read from the memory device 10, such as by the host device, whereby the memory device 10 operates as volatile memory, such as Double Data Rate DRAM (e.g., DDR4 and DDR5 SDRAM). The host device may, in some embodiments, also include separate non-volatile memory, such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) as well as other types of memory devices (e.g., storage), such as solid state drives (SSD's), MultimediaMediaCards (MMC's), Secure-Digital (SD) cards, CompactFlash (CF) cards, or any other suitable device. Further, it should be appreciated that the host device may include one or more external interfaces, such as Universal Serial Bus (USB), Peripheral Component Interconnect (PCI), PCI Express (PCI-E), Small Computer System Interface (SCSI), IEEE 1394 (Firewire), or any other suitable interface as well as one or more input devices to permit a user to input data into the host device, such as by using buttons, switching elements, a keyboard, a light pen, a stylus, a mouse, and/or a voice recognition system. The host device may optionally also include an output device, such as a display coupled to the processor and a network interface device, such as a Network Interface Card (NIC), for interfacing with a network, such as the Internet. As will be appreciated, the host device may include many other components, depending on the application of the host device.

Keeping the foregoing in mind, the command decoder 32 may decode commands and control data movement in and out of the memory banks 12. In some cases, a DQ symbol map is generated and referenced to program respective bi-directional databuses (DQs) of the data path circuitry 46. The command decoder 32 and/or a memory controller may program configurations of the DQ symbol map to assign different DQ symbols or different portions of the DQ symbol to one or more sub-word line (SWL) drivers, as will be discussed later. In some cases, the data path circuitry 46 also includes control logic 48 coupled between the I/O interface 16 and the DQs of the data path circuitry 46. The control logic 48 may include switching logic circuitry, control circuitry, or the like, that operates in response to control signals. The control signals may be generated by processing circuitry of the control logic 48, the command decoder, or other suitable signal generation circuitry to program one or more on-the-fly routing changes between the I/O interface 16 and the memory banks 12 to use different DQ symbol maps. The control logic 48 may include multiplexing circuitry, hard programmed routing (e.g., wires), or the like to route a DQ symbol map, like the DQ symbol maps of FIGS. 2-6. Additionally or alternatively, the data path circuitry 46 may include multiple data pathways that the control logic 48 may switch between based on a particular implementation of the memory banks 12 (e.g., DDR5 v. DDR4). The data pathways of the data path circuitry 46 may be programed responsive to control signals from the command decoder 32 corresponding to activation of one or more of the memory banks 12.

When accessing data of the memory banks 12, circuitry of the bank control block 22 may misoperate. Data errors resulting from the misoperation are sometimes correctable by ECC operations. However, the misoperation of the bank control block 22 may cause data errors that span multiple DQ symbols, which may make the data errors uncorrectable. For example, certain ECC operations may be able to correct data errors spanning the same DQ symbol but not errors that span multiple DQ symbols. Thus, writing data based on DQ symbol configurations of the memory banks 12 to avoid sharing circuitry of the bank control block 22 that may end up being a common cause of data errors may improve memory device operation by improving reliability, uptime, and resource allocations by enabling more computing resources to be used performing non-ECC operations. Example DQ symbol maps are described herein that represent configurations employed by the control logic 48 based on rules followed by example ECC operations to reduce a likelihood of uncorrectable data errors occurring in response to a memory error.

Figure 2:
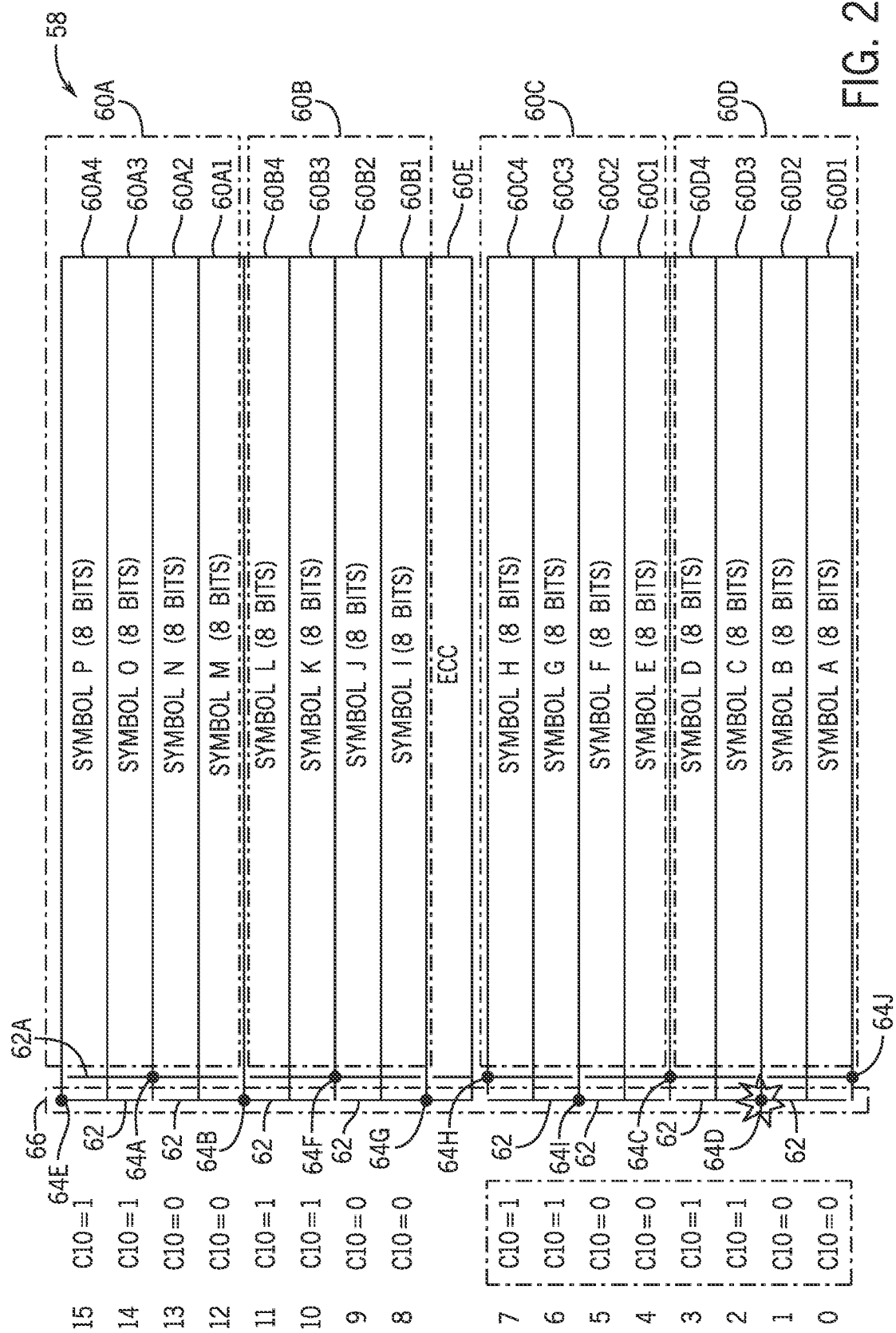
FIG. 2 is a diagrammatic representation of a first example memory bank of FIG. 1, in accordance with an embodiment.

To elaborate, FIG. 2 is a map 58 of data lines (DQ) (e.g., DQ symbol map) in an embodiment of a DDR5×4 DQ symbol mapping for a memory bank 12 illustrated in association with sub-word lines (SWL) 62 and sub-word line drivers (SWL drivers) 64 of the memory bank 12 and the bank control block 22. The map 58 is used for illustrative purposes, but other embodiments may include other mappings and/or different numbers of DQ symbols per bank. As illustrated, the memory bank 12A may correspond to column planes 60A1-60E (column planes 60A1, 60A2, 60A3, 60A4, 60B1, 60B2, 60B3, 60B4, 60C1, 60C2, 60C3, 60C4, 60D1, 60D2, 60D3, 60D4, 60E). Some embodiments may have different numbers of column planes per memory bank 12. The column planes 60A1-60E may be associated with a DQ symbol for respective column addresses and even/odd sense amplifiers. For instance, the column planes 60A (60A1, 60A2, 60A3, 60A4) correspond to DQ3 (symbols M, N, O, and P), the column planes 60B (60B1, 60B2, 60B3, 60B4) correspond to DQ2 (symbols I, J, K, and L), the column planes 60C (60C1, 60C2, 60C3, 60C4) correspond to DQ1 (symbols E, F, G and H), and the column planes 60D (60D1, 60D2, 60D3, 60D4) correspond to DQ0 (symbols A, B, C and D). The column plane 60E corresponds to on die error control code (ECC). Each group of DQ symbols may correspond to two or more data bytes corresponding to even and odd sense amplifiers. A specific byte may be addressed using a combination of a logical state of a first address signal (CA2), a second address signal (CA3), and a column select address signal C(n), which is C10 in this example.

Data to be written or read from the memory bank 12A by decoding word lines (WL) 66 that run across the memory bank 12A in a direction perpendicular to the column planes 60. A WL 66 may be divided into sub-word lines (SWL) 62, which may correspond to SWL drivers 64. A respective SWL driver 64 may control data transmission to and from respective column planes 60. For example, SWL 62A is activated by SWL driver 64A to access data stored in column planes 60A. When the WL 66 is fired globally, corresponding SWL drivers 64E, 64B, 64G, 64I, 64D may activate to output data in parallel from some of the column planes 60. When a SWL driver 64 misoperates, each of the corresponding column planes 60 output data with errors. For example, if SWL driver 64D were to misoperate when activated via WL 66, data read out from the column planes 60D would include data errors in symbols A, B, C, and D but would remain correctable since the errors span one DQ and a state of the column select address signal C10 chooses between symbols A and B or C and D as being output, which a symbol correction rule associated with the ECC of column plane 60E may define as correctable.

The control logic 48 may isolate column planes 60 of different DQ symbols by configuring the data path circuitry 46 to route data of different DQ symbols into column planes 60 of different SWL drivers 64. Thus, data corresponding to a same DQ is written to column planes 60 of a same SWL driver 64. This is an example of data arrangement-based isolation since the isolation of the DQ symbols from each other is done based on arrangement of data followed when writing the DQ data to the column planes 60.

Even with the data arrangement-based isolation, some SWL drivers 64 may correspond to different DQ symbols, for instance SWL driver 64C controls column plane 60C1 corresponding to DQ1 (e.g., includes symbols E, F, G and H) and controls column plane 60D4 corresponding to DQ0 (e.g., includes symbols C and D). Another isolation operation, column select-based isolation, may be used with the data arrangement-based isolation to further protect against uncorrectable data errors occurring. Indeed, column select decode signals (C10) may be used to address subsets of the column planes 60 based on the different addresses decoded (e.g., C10=1 and C10=0 yield different subsets of column planes 60). For the ×4 memory bank 12A, data from the column planes 60A4, 60A3, 60B4, 60B3, 60C4, 60C3, 60D4, and 60D3 may output data at a different time than the column planes 60A2, 60A1, 60B2, 60B1, 60C2, 60C1, 60D2, and 60D1 based on the C10 signals. It is noted that any suitable column select address C(n) may be used to create this isolation if different states of the signal are used between a pair of different, neighboring column planes.

Figure 3:
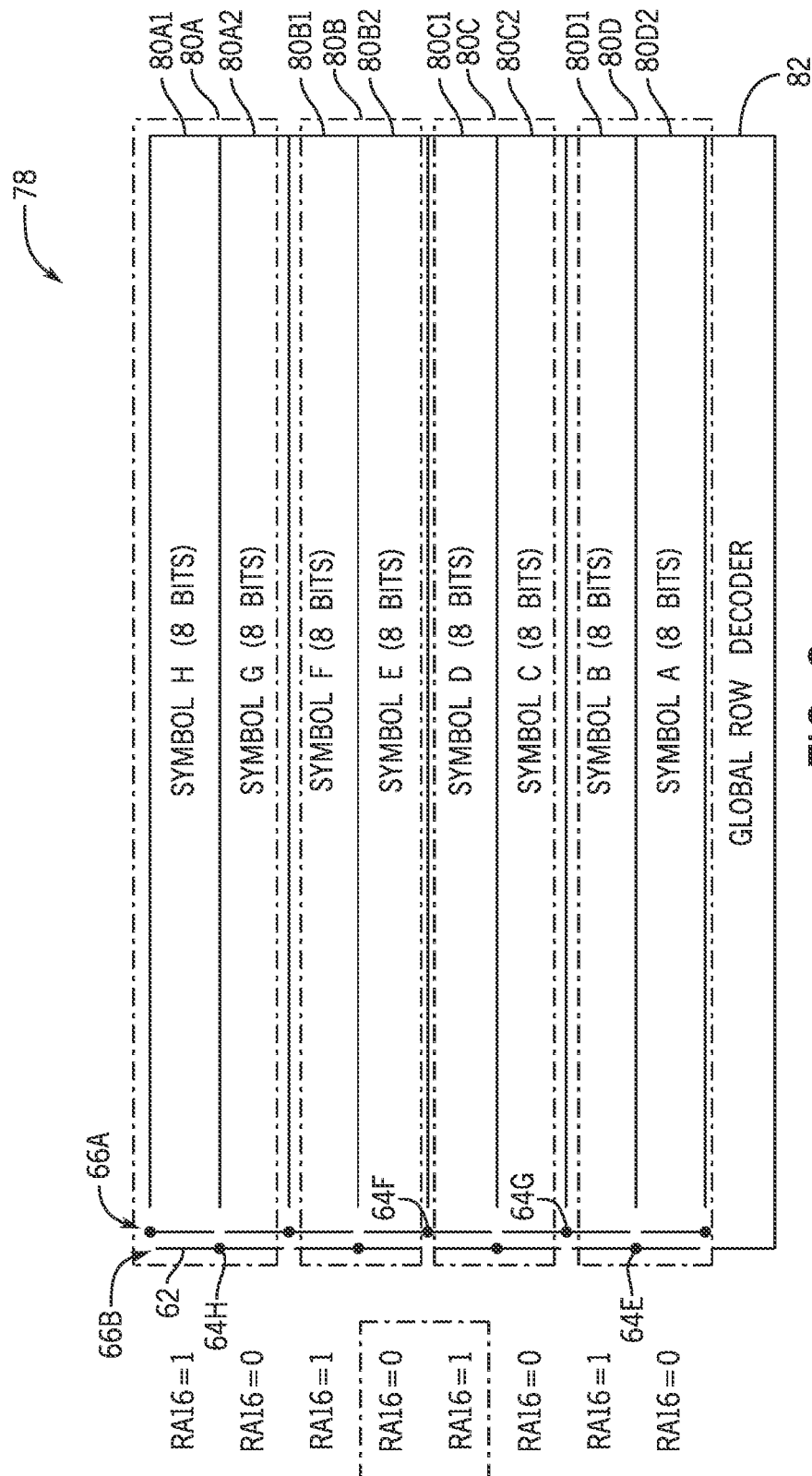
FIG. 3 is a diagrammatic representation of a second example memory bank of FIG. 1, in accordance with an embodiment.

The control logic 48 may sometimes control memory banks 12 with row planes. For example, FIG. 3 is a map 78 of a DQ symbols in an embodiment of a DDR4×4 1K activation DQ symbol mapping for a memory bank 12 illustrated in association with SWL 62 and SWL drivers 64 of the memory bank 12 and the bank control block 22. The map 78 is used for illustrative purposes, but other embodiments may include other mappings and/or different numbers of DQ symbols per bank. As illustrated, the memory bank 12 may correspond to row planes 80A1-80E (row planes 80A1, 80A2, 80B1, 80B2, 80C1, 80C2, 80D1, 80D2, 80E) in different groups, and greater than or fewer row planes may be used in an actual implementation. The row planes 80A1-80D2 are associated with different DQ symbols. For instance, the row planes 80A (80A1, 80A2) correspond to DQ3 associated with symbols G and H, the row planes 80B (80B1, 80B2) correspond to DQ1 associated with symbols E and F, the row planes 80C (80C1, 80C2) correspond to DQ2 associated with symbols C and D, and the row planes 80D (80D1, 80D2) correspond to DQ0 associated with symbols A and B. Each pair of DQ symbols may correspond to two or more data bytes each including at least 4 bits. A global row decoder 82 may be shared across each of the row planes 80A1-80D2. The SWL drivers 64 may correspond to different WL 66 (66A, 66B).

The control logic 48 may isolate row planes 80 of different DQ symbols by configuring the data path circuitry 46 to route data of different DQ symbols into row planes 80 of different SWL drivers 64. Thus, data corresponding to a same DQ is written to row planes 80 of a same SWL driver 64. This may be another example of data arrangement-based isolation.

Even with the data arrangement-based isolation, some SWL drivers 64 may correspond to different DQ symbols, for instance SWL driver 64F of WL 66A corresponds to both DQ1 symbol D and DQ2 symbol E. Without additional isolation, a single SWL driver 64 misoperating could take out row planes 80 on each of its arms. For example, if both arms of the SWL driver 64F misoperated, data read out from both row planes 80B2 and 80C1 would include data errors, and these data errors may be uncorrectable since the errors span two DQ symbols that violate the correction rules. The same applies to SWL drivers 64G, 64H.

Thus, row select-based isolation may be used with the data arrangement-based isolation to further protect against uncorrectable data errors occurring. A memory controller may time accesses of row planes 80 for adjacent DQs sharing a SWL driver 64 to structurally isolate outputs from the DQ symbols via address signals RA(n), for example RA16, to prevent some memory errors in one DQ symbol from spanning to the second DQ symbol, where this spanning breaks an example correction rule. Using both isolation operations, if SWL driver 64E were to misoperate, data read out from the row planes 80D would include correctable data errors since the errors span one DQ and include symbols A and B. Indeed, row select decode signals (RA16) may address subsets of the row planes 80 based on the different addresses decoded (e.g., RA16=1 and RA16=0 yield different subsets of row planes 80). For the ×4 memory bank 12A, data from the row planes 80A1, 80B1, 80C1, and 80D1 may be operated to output data at a different time than the row planes 80A2, 80B2, 80C2, and 80D2 via the state of RA16. This row address partitioning (e.g., partitioning based on the row address symbol state) may prevent an uncorrectable error rooted in SWL driver 64F misoperation, which may otherwise cause symbol D and Symbol E to have errors. Errors on both symbol D and symbol E may remain correctable, if occurring, because the symbol D and symbol E get accessed at different times, thereby causing associated errors to occur at different times based on different RA16 partitions.

Figure 4:
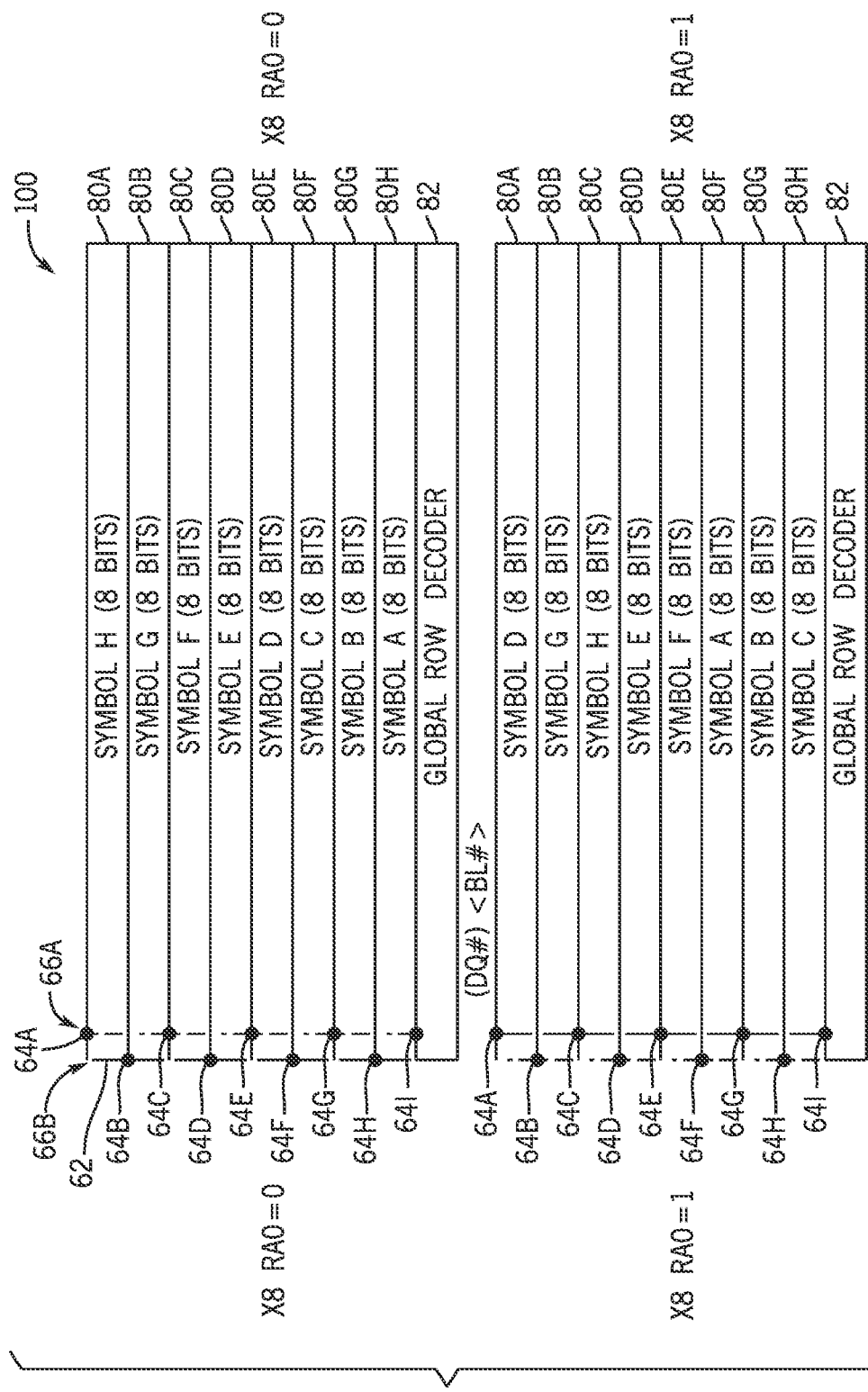
FIG. 4 is a diagrammatic representation of a third example memory bank of FIG. 1, in accordance with an embodiment.
Figure 5:
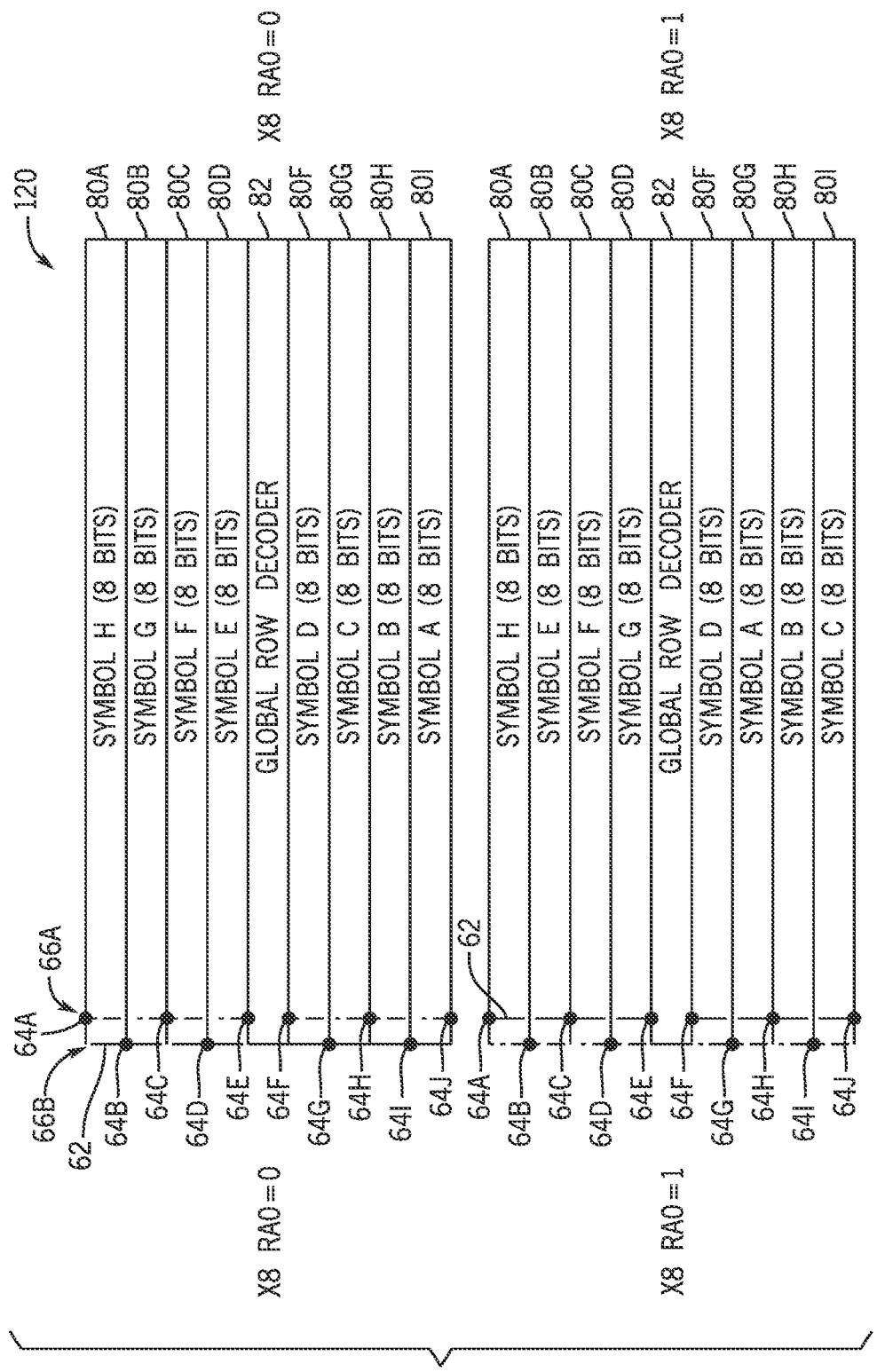
FIG. 5 is a diagrammatic representation of a fourth example memory bank of FIG. 1, in accordance with an embodiment.
Figure 6:
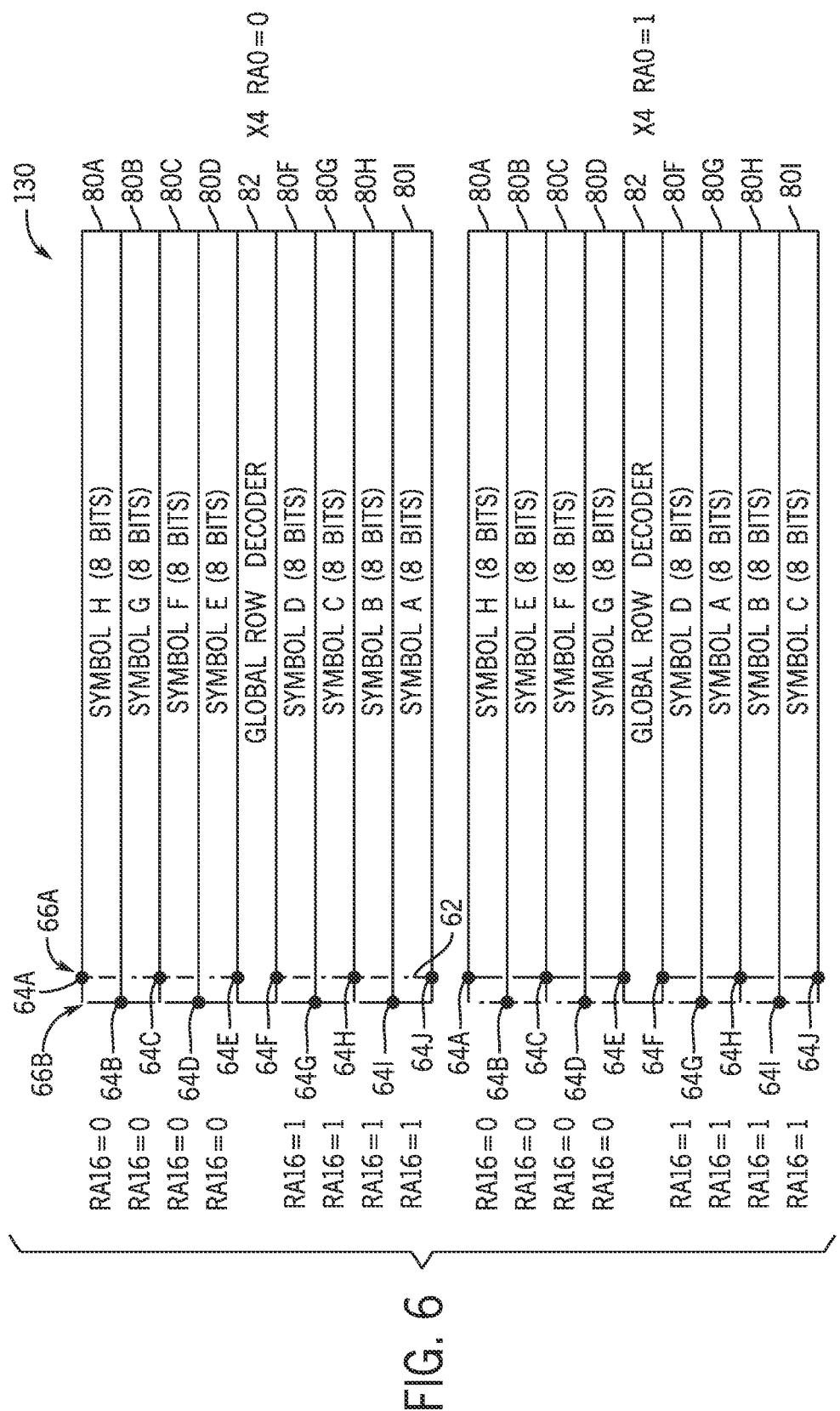
FIG. 6 is a diagrammatic representation of a fifth example memory bank of FIG. 1, in accordance with an embodiment.

Keeping the foregoing in mind, FIGS. 4-6 describe additional combinations of isolation operations that may be applied to different memory array structures. Each of the following descriptions may be used alone or in combination with other systems and methods described herein.

In some cases, the memory bank 12 includes 8 DQ symbols, and thus the control logic 48 may sometimes control memory banks 12 with row planes 80 corresponding to 8 DQ symbols. For example, FIG. 4 is a map 100 of DQ symbols in an embodiment of a DDR4×8 1K activation DQ symbol mapping for a memory bank 12 illustrated in association with SWL 62 and SWL drivers 64. For ease of reference, the DQs may be referred to interchangeably by symbol name (e.g., symbol A-H) at a particular RA activation state (e.g., RA0=0 v. RA0=1). The map 100 is used for illustrative purposes, but other embodiments may include other mappings and/or different numbers of DQ symbols per bank.

As illustrated, the memory bank 12 may correspond to row planes 80A-80I (row planes 80A, 80B, 80C, 80D, 80E, 80F, 80G, 80H, 80I), and a different number of row planes 80 may be used in an actual implementation. The row planes 80A-80I are associated with different DQs in different activation states (e.g., RA0=0 v. RA0=1). For instance, between the different activation states, the row plane 80A corresponds to DQ7 symbol H or DQ3 symbol D, the row plane 80B corresponds to DQ5 symbol G, the row plane 80C corresponds to DQ6 symbol F or DQ7 symbol H, the row plane 80D corresponds to DQ4 symbol E, the row plane 80E corresponds to DQ3 symbol D or DQ6 symbol F, the row plane 80F corresponds to DQ1 symbol C or DQ0 symbol A, the row plane 80G corresponds to DQ2 symbol B and the row plane 80H corresponds to DQ0 symbol A or DQ1 symbol C. A global row decoder 82 shared across each of the row planes 80A-80H.

Map 100 is an example of bank-level activation isolation and data arrangement-based isolation. The SWL drivers 64 may correspond to different WLs 66 (66A, 66B) activated at different times using an address signal RA0 that is set during activation of the memory bank 12. It is noted that, although address signal RA0 is used in this example, other implementations may use different row addresses to identify which SWL driver (SWD) activate in which column planes. When in an activation state set via the address signal RA0=0, WL 66B (e.g., SWL drivers 64B, 64D, 64F, 64H) is activated and WL 66A (e.g., SWL drivers 64A, 64C, 64E, 64G, 64I) is not activated, which enables reading of symbols in a first parallel arrangement (e.g., Symbol H, G, F, E, D, C, B and A). When in an activation state set via the address signal RA0=1, WL 66B is not activated and WL 66A is activated, which enables reading of symbols in a second parallel arrangement different (e.g., Symbol D, G, H, E, F, A, B and C) from the first parallel arrangement.

The switching logic circuitry of the control logic 48 may use bank level-based isolation and data arrangement-based isolation via its routing configuration set by the control logic 48, memory controller, command decoder, or other suitable command-generating control or input circuitry. In some cases, the switching logic circuitry may include the programmable routing protected with fuses or other circuitry to permanently fix a routing. In response to the different states of RA0, the switching logic circuitry reroutes written data to the memory bank 12C according to the first parallel arrangement (e.g., RA0=0) or the second parallel arrangement (e.g., RA0=1) so as to ensure that the different DQ symbols sharing a SWL driver 64 may be corrected using the rules of correction. In this way, if two symbols were to include errors, the errors may be corrected as long as belonging to a certain pair. For instance, if two symbols have corrupted data in them, the correction algorithm can correct them if the failing data belongs to symbols (A and B) or (C and D) or (E and F) or (G and H). In other words, a SWL driver 64 driving both DQ0 symbol A and DQ1 symbol C may output an uncorrectable error, but a SWL driver 64 driving both DQ0 symbol A and DQ2 symbol B may output a correctable error if the SWL driver has a defect causing some or all the bits connected to that SWL driver to be corrupted.

As an example, Table 1 summarizes combinations of DQ symbols with DQ0 symbol A that may or may not result in an uncorrectable error when the memory error is caused by a common cause SWL driver 64 error. Although Table 1 is described with reference to DQ0 symbol A, it should be understood that each of the DQs has its own valid and invalid SWL driver 64 pairings based on the correction rules being applied. Control circuitry, like the control logic 48, may consider valid and invalid DQ pairings when designing or employing a DQ symbol map.

TABLE 1

| | | |
|---|---|---|
| DQ0 Symbol A | DQ1 Symbol C | Invalid combination; uncorrectable error. |
| DQ0 Symbol A | DQ2 Symbol B | Valid combination; correctable error. |
| DQ0 Symbol A | DQ3 Symbol D | Invalid combination; uncorrectable error. |
| DQ0 Symbol A | DQ4 Symbol E | Invalid combination; uncorrectable error. |
| DQ0 Symbol A | DQ5 Symbol G | Invalid combination; uncorrectable error. |
| DQ0 Symbol A | DQ6 Symbol F | Invalid combination; uncorrectable error. |
| DQ0 Symbol A | DQ7 Symbol H | Invalid combination; uncorrectable error. |

The switching logic circuitry may include interconnected multiplexer circuitry to couple to the SWL drivers 64 or other switching circuitry. Control signals from the memory controller may operate the multiplexer circuitry or switching circuitry into different input/output combinations, thereby reprograming a configuration of the switching logic circuitry in response to command addressing either RA0=1 or RA0=0. Table 2 visualizes this example reprogramming as causing different arrangements of the DQ symbols in relative position from the global row decoder 82. The switching logic circuitry may reroute one or more of the DQ symbols to comply with the ECC correction rules described above. It is noted that DQ3 symbol D and DQ1 symbol C for RA0=1 and symbol H and symbol A for RA0=0 are on an edge and thus may not share a SWL driver 64 with another DQ so may output correctable data errors even if the SWL driver 64A and/or SWL driver 64I misoperate, and DQ4 symbol E and DQ5 symbol G are not rerouted in response to the RA0 states.

TABLE 2

| RA0 State | Row plane 80A | Row plane 80B | Row plane 80C | Row plane 80D | Row plane 80E | Row plane 80F | Row plane 80G | Row plane 80H |
|---|---|---|---|---|---|---|---|---|
| RA0 = 0 | H | G | F | E | D | C | B | A |
| RA0 = 1 | D | G | H | E | F | A | B | C |

In some cases, the memory bank includes 8 DQ symbols and a bilateral global row decoder 82 as opposed to the unilateral global row decoder 82 shown in FIG. 4. For example, FIG. 5 is a map 120 of DQ symbols in an embodiment of a DDR4×8 1K activation DQ symbol mapping for a memory bank 12 illustrated in association with SWL 62 and SWL drivers 64 of the memory bank 12 and the bank control block 22. The map 120 is used for illustrative purposes, but other embodiments may include other mappings and/or different numbers of DQ symbols per bank. Similar to FIG. 4, the memory bank 12 may correspond to row planes 80A-80I (row planes 80A, 80B, 80C, 80D, 80E, 80F, 80G, 80H, 80I), associated with different DQ symbols in different activation states. The placement of the global row decoder 82 is adjusted in location. A row plane 80I corresponds to DQ0 symbol A, and the global row decoder 82 may drive the word lines from two sides as opposed to from one side. The switching logic circuitry and/or the control logic 48 are used to adjust the arrangements shown in FIG. 4 to accommodate the adjusted placement of the global row decoder 82. For instance, between the different activation states, the row plane 80A corresponds to DQ7 symbol H, the row plane 80B corresponds to DQ5 symbol G and DQ4 symbol E, the row plane 80C corresponds to DQ6 symbol F, the row plane 80D corresponds to DQ4 symbol E and DQ5 symbol G, the row plane 80F corresponds to DQ3 symbol D, the row plane 80G corresponds to DQ1 symbol C or DQ0 symbol A, the row plane 80H corresponds to DQ2 symbol B, and the row plane 80I corresponds to DQ0 symbol A or DQ1 symbol C. Table 3 visualizes this reprogramming. The switching logic circuitry and/or the control logic 48 may reroute some of the DQ symbols according to the DQ symbol map 120 to perform bank level-based isolation operations and data arrangement-based isolation, enabling a DDR4×8 DQ memory device to comply with the rules for ECC correctability. Here, some of the edge DQ symbols are rerouted to improve the success of correctability when a shared SWL driver is defective. DQ7 symbol H (row plane 80A) and DQ3 symbol D (row plane 80F) may remain in an original arrangement for each activation state. DQs on an edge, like DQ7 symbol H or DQ3 symbol D, may output correctable data errors even if the SWL driver 64A and/or SWL driver 64I misoperate since the edge position is not paired with another DQ symbol.

TABLE 3

| RA0 State | Row plane 80A | Row plane 80B | Row plane 80C | Row plane 80D | Row plane 80F | Row plane 80G | Row plane 80H | Row plane 80I |
|---|---|---|---|---|---|---|---|---|
| RA0 = 0 | H | G | F | E | D | C | B | A |
| RA0 = 1 | H | E | F | G | D | A | B | C |

The placement of the global row decoder 82 may be used to isolate the two halves of the bank from each other. In this way, memory errors afflicting any of the DQ5-7 symbols are isolated from the DQ0-3 symbols via the global row decoder 82, and vice versa. This arrangement may also decrease a likelihood of uncorrectable memory errors.

Furthermore, in some cases, the memory bank includes 4 DQ symbols as opposed to 8 DQ symbols of FIG. 5. For example, FIG. 6 is a map 130 of DQ symbols in an embodiment of a DDR4×4 512 activation DQ symbol mapping for a memory bank 12 having 512B page activation illustrated in association with SWL 62 and SWL drivers 64 of the memory bank 12 and the bank control block 22. The map 130 is used for illustrative purposes, but other embodiments may include other mappings and/or different numbers of DQ symbols per bank. Similar to FIG. 4, the memory bank 12 may correspond to row planes 80A-80I (row planes 80A, 80B, 80C, 80D, 80E, 80F, 80G, 80H, 80I), associated with different DQ symbols in different activation states and even/odd sense amplifiers.

The RA16 signal may select between one side of the memory bank 12 and another side, bisected via global row decoder 82. The global row decoder 82 may drive the word lines associated with SWL drivers 64 from two sides as opposed to from one side.

The switching logic circuitry and/or the control logic 48 may adjust the arrangements of row planes 80A-80D shown in FIG. 5 to accommodate the lesser number of DQ symbols. For instance, between the different activation states, the row plane 80A corresponds to DQ3 symbol H, the row plane 80B corresponds to DQ1 symbol G and DQ0 symbol E, the row plane 80C corresponds to DQ2 symbol F, the row plane 80D corresponds to DQ0 symbol E and DQ1 symbol G, the row plane 80F corresponds to DQ3 symbol D, the row plane 80G corresponds to DQ1 symbol C or DQ0 symbol A, the row plane 80H corresponds to DQ2 symbol B, and the row plane 80I corresponds to DQ0 symbol A or DQ1 symbol C. Table 4 may visualize this example reprogramming. The switching logic circuitry and/or the control logic 48 may reroute some of the DQ symbols according to a DQ symbol map to perform bank level-based isolation and data arrangement-based isolation operations, enabling a DDR4×4 DQ memory device to comply with ECC specifications. Here, some of the edge row planes 80D and 80I are rerouted to improve overall compliance with the ECC operation rule. Row plane 80A and row plane 80F, each assigned to DQ3 symbol H, may remain in an original arrangement for each activation state. Furthermore, row planes 80C and row plane 80H, each assigned to DQ2 symbol B, may remain in an original arrangement for each activation state.

TABLE 4

| RA0 State | Row plane 80A | Row plane 80B | Row plane 80C | Row plane 80D | Row plane 80F | Row plane 80G | Row plane 80H | Row plane 80I |
|---|---|---|---|---|---|---|---|---|
| RA0 = 0 | H | G | F | E | D | C | B | A |
| RA0 = 1 | H | E | F | G | D | A | B | C |

Figure 7:
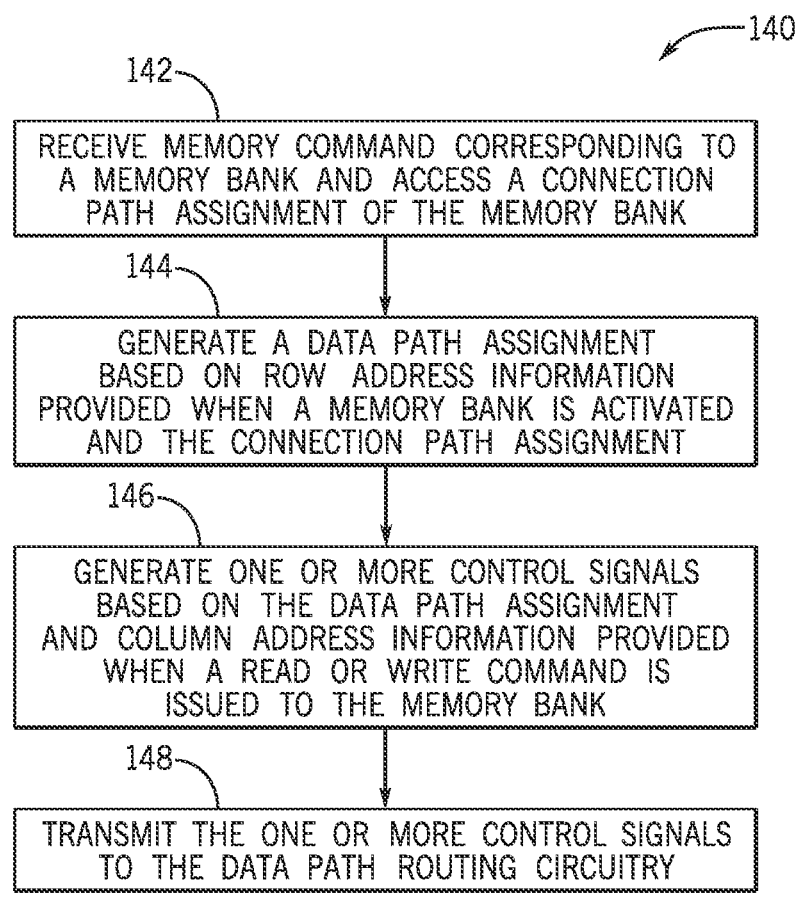
FIG. 7 is a flow diagram of a method for generating and employing a data path (DQ) routing control signals for the data path circuitry of FIG. 1, in accordance with an embodiment.

FIG. 7 is a flowchart 140 illustrating a method for generating and employing a data path (DQ) symbol map in data path circuitry 46 of FIG. 1. Although certain operations of the flowchart 140 are presented in a particular order in FIG. 7, it should be understood that additional or fewer operations may be used in a same or different operational order than that presented below. Furthermore, although described herein as being performed by the control logic 48, it should be understood that other circuitry may perform some or all of the operations described herein. Indeed, a processor executing instructions stored in a tangible, computer-readable medium, such as instructions corresponding to a design application or other software, may perform operations of the flowchart 140.

At block 142, control logic 48 may receive a memory command corresponding to a memory bank 12 and may access one or more connection path assignments of the memory bank 12. The memory command may instruct the control logic 48 to write data into, read data from, or refresh data stored in the memory bank 12, which involve an activation of the memory bank 12. The connection path assignments may include information indicating a physical location of data symbols in a memory array (e.g., a mapping between a SWL driver 64 and a data symbol), and thus where data stored in a particular data symbol is located. The information may indicate the address being accessed in the memory command as mapped to the physical location of the data symbols within the memory bank 12. Indeed, the memory bank 12 and bank control block 22 may be connected with a specific arrangement of how the data path physically stores symbol data in the memory bank 12. This assignment may be made based on known correctability rules and guidelines for the system. These connection path assignments may be hardcoded when the design is first built or fuse programmable for flexible mapping to be determined after the chip is built, and in some systems both approaches may be used with one or more of the memory banks 12. A processing system, like the control logic 48 or another suitable control circuit, may generate the connection path assignments during operation, after user deployment, after the chip is built, or the like. The symbol map follows the connection path assignments such that certain symbols are assigned to certain physical locations maintained over one or more memory accesses, where the locations might group the data by sub wordline driver, column select, column plane, sense amp stripe, or the like. Indeed, circuits, like the processing system, may generate the mapping of the connection path assignments to help maximize data isolation and provide data groupings that have the relatively better chance of success for correction in the event of a physical defect or data error, as generally described above to avoid generation of a non-correction condition.

At block 144, the control logic 48 may generate a data path assignment based on row address information provided when the bank is activated and the connection path assignment. The data path assignment may be used to assign data received to one or more SWL drivers 64 (and thus data symbols) based on the physical locations of the SWL drivers 64 indicated in the connection path assignment. Bank activation may provide row address RA(n) and RA0 which may be used to identify which SWL drivers 64 are active, and thus data may be assigned to one or more of the active SWL drivers 64. This could be the state of RA0 or the state of one of the other row addresses RA(n). This row address information is specific for each active bank. It may identify with which SWL driver 64 to associate the data. The data path assignment may follow a DQ symbol map, as described with FIGS. 2-6, to route data to avoid the creation of the non-correction condition when storing data in the memory device 10 according to the DQ symbol map. The data path assignment may include rerouted original data path assignments that were rerouted based on the non-correction condition to avoid the creation of or meeting of the non-correction condition. The control logic 48 may incrementally change the data path assignments to find assignments relatively more compliant with the error correction operations.

At block 146, the control logic 48 may receive bank specific column address information when a read or write command is issued to the memory bank 12. The control logic 48 may generate one or control signals based on the data path assignment determined at block 144 and column address CA(n) information provided when the memory bank 12 was activated. The one or more control signals may be generated from the RA and CA addresses, where a subset may multiplex the data path so that physical data locations in the memory bank 12 may be assigned to correctible symbol groups in the data path.

At block 148, the control logic 48 may transmit the one or more control signals generated at block 146 to data path circuitry 46 to program the data path assignment. Transmitting the one or more control signals may cause the data path circuitry 46 to reroute a bi-directional data path (DQ symbol) from a first SWL driver 64 to a second SWL driver 64. Indeed, the connection path assignment may have preliminarily assigned the DQ symbol to the first SWL driver 64 and the control logic 48 is reassigning the DQ symbol to a relatively more compliant location of second SWL driver 64 with the transmission of the one or more control signals. For example, a DQ1 symbol C of FIG. 6 may be rerouted from a first SWL driver 64G of a data plane when RA0=0 to a second SWL driver 64J of an interior data plane when RA0=1 to eliminate a likelihood for causing the non-correction condition (e.g., a memory error on Symbol B and Symbol C DQs being driven by SWL driver 64H) if the rerouting had not been made.

FIGS. 8-11 are circuit diagrams of data routing circuitry that may be included upstream from the SWL drivers 64 and/or the symbols. Each circuit diagram may include data paths 100 and selectable devices 152, where the selectable devices 152 may be turned on by a received address signal (e.g., CA10, RA16, RA0) to let data from a corresponding of the data paths 100 transmit through to the downstream symbols (as labeled), for example, in FIG. 8, "symbol P" or "symbol N" receives data from "symbol H'", "symbol L" or "symbol J" receives data from "symbol F'" and the like. Thus, each transaction between a host device and the memory bank 12 involves transmitting data between symbols via the selectable devices 152.

Figure 8:
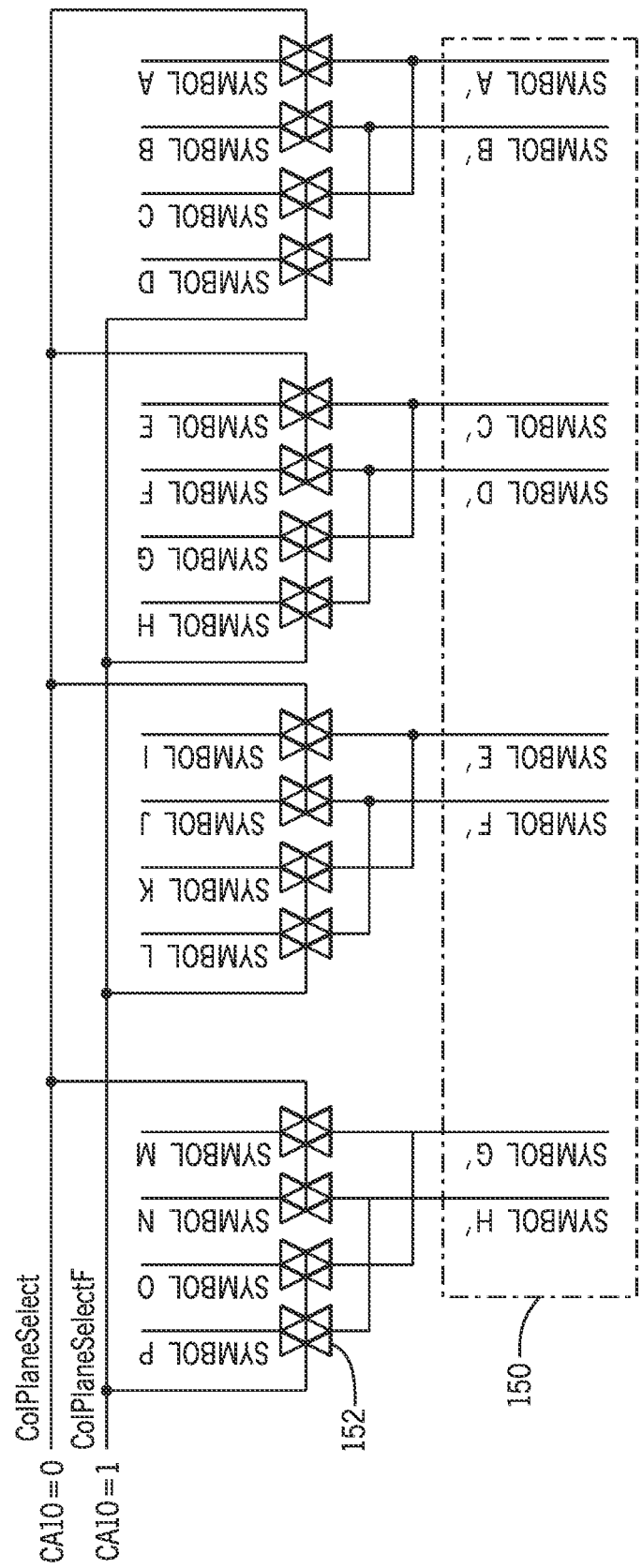
FIG. 8 is a circuit diagram of data routing circuitry corresponding to FIG. 2 symbol mapping, in accordance with an embodiment.

FIG. 8 is a circuit diagram of data routing circuitry corresponding to FIG. 2 symbol mapping. For example, FIG. 8 shows how CA10 may be used to select symbols from the array. Following this illustrated data routing to the various symbols may cause data to be output in such a way that makes physical SWL Driver and Column Select defects more likely to be repairable when a correction code restriction can only correct multi-symbol error if occurring in Symbols (A' and B') or (C' and D') or (E' and F') or (G' and H'), where is prime and indicates the data path version of the symbols as opposed to the DQ version of the symbols. Either CA10=0 or CA10=1 is used to select a subset of the symbols, or column planes 60, for output to the data paths 100 or to be loaded with data from the data paths 100. For example, the state of CA10 is used to toggle communication from the memory bank 12 to the data path 100 of symbol H' between symbol P and symbol N corresponding to column planes 60A4 and 60A2 shown in FIG. 2. Other selection operations also apply to toggle the data path of symbols A'-G' between the different column planes 60 but are skipped for clarity of description.

Figure 9:
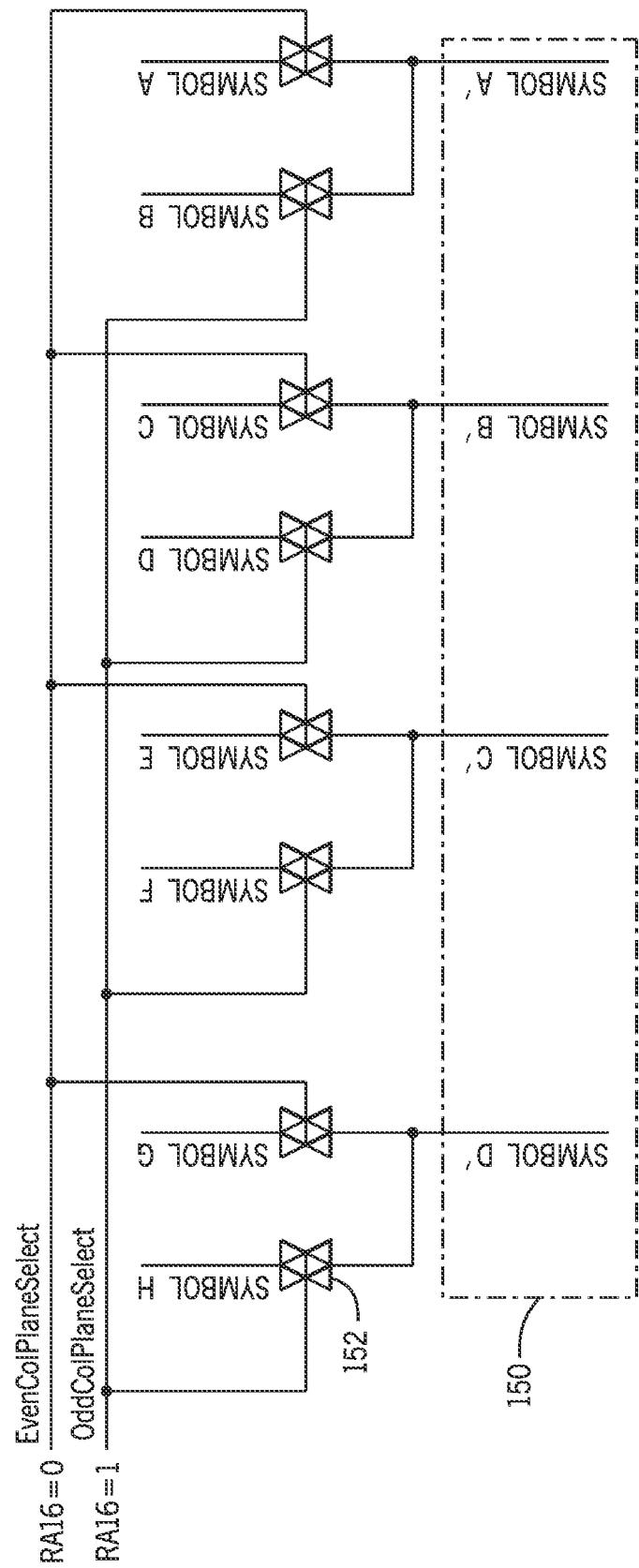
FIG. 9 is a circuit diagram of data routing circuitry corresponding to FIG. 3 symbol mapping, in accordance with an embodiment.

FIG. 9 is a circuit diagram of data routing circuitry corresponding to FIG. 3 symbol mapping. Similar to FIG. 8, a state of row address signal RA16 is used to select a subset of symbols, or row planes 80, for access to improve correctability of potential data errors. For example, using RA16 to select symbols from the memory bank 12 to be output in such a way that makes physical SWL Driver and Column Select defects more likely to be repairable when correction code restriction can only correct multi symbol fails if the fails happen in Symbols (A' and B') or (C' and D'), where ' indicates the data path version of the symbols. For example, the state of RA16 is used to toggle communication from the memory bank 12 to the data path 100 of symbol D' between symbol H and symbol G corresponding to row planes 80A1 and 80A2 shown in FIG. 3. Other selection operations also apply to toggle the data path of symbols A'-C' between the different row planes 80 but are skipped for clarity of description.

Figure 10:
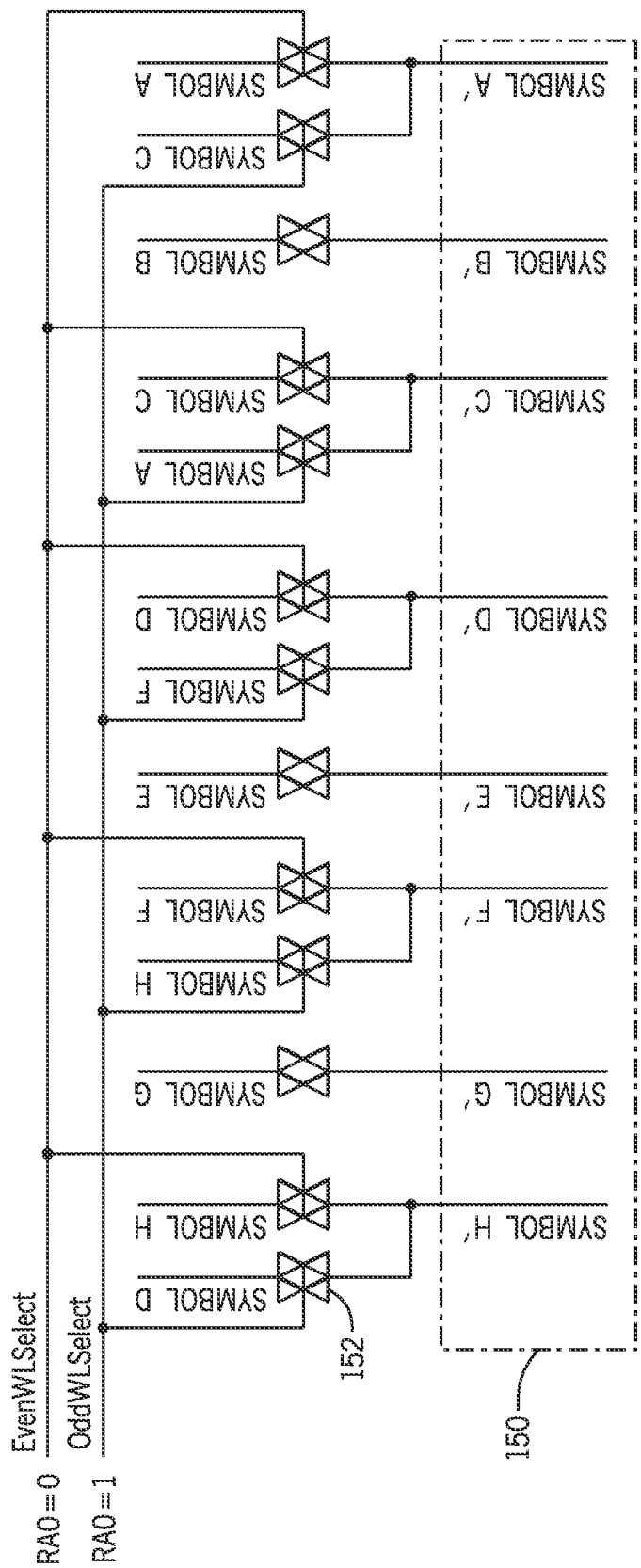
FIG. 10 is a circuit diagram of data routing circuitry corresponding to FIG. 4 symbol mapping, in accordance with an embodiment.

FIG. 10 is a circuit diagram of data routing circuitry corresponding to FIG. 4 symbol mapping. Similar to FIG. 9, a state of row address signal RA0 is used to select a subset of symbols, or row planes 80, for access to improve correctability of potential data errors. For example, using RA0 to select symbols from the memory bank to be output in such a way that makes physical SWL Driver defects more likely to be repairable when correction code restriction can only correct multi-symbol errors if the errors happen in Symbols (A' and B') or (C' and D') or (E' and F') or (G' and H'), where ' indicates the data path version of the symbols. For example, the state of RA0 may be used toggle communication from the memory bank 12 to the data path 100 of symbol H' between symbol D and symbol H corresponding to row planes 80A shown in FIG. 4. Other selection operations also apply to toggle the data path of symbols A', C', D', and F' between the different row planes 80 but are skipped for clarity of description. Data path symbols G', E' and B' may not switch between symbols in response to the state of RA0.

Figure 11:
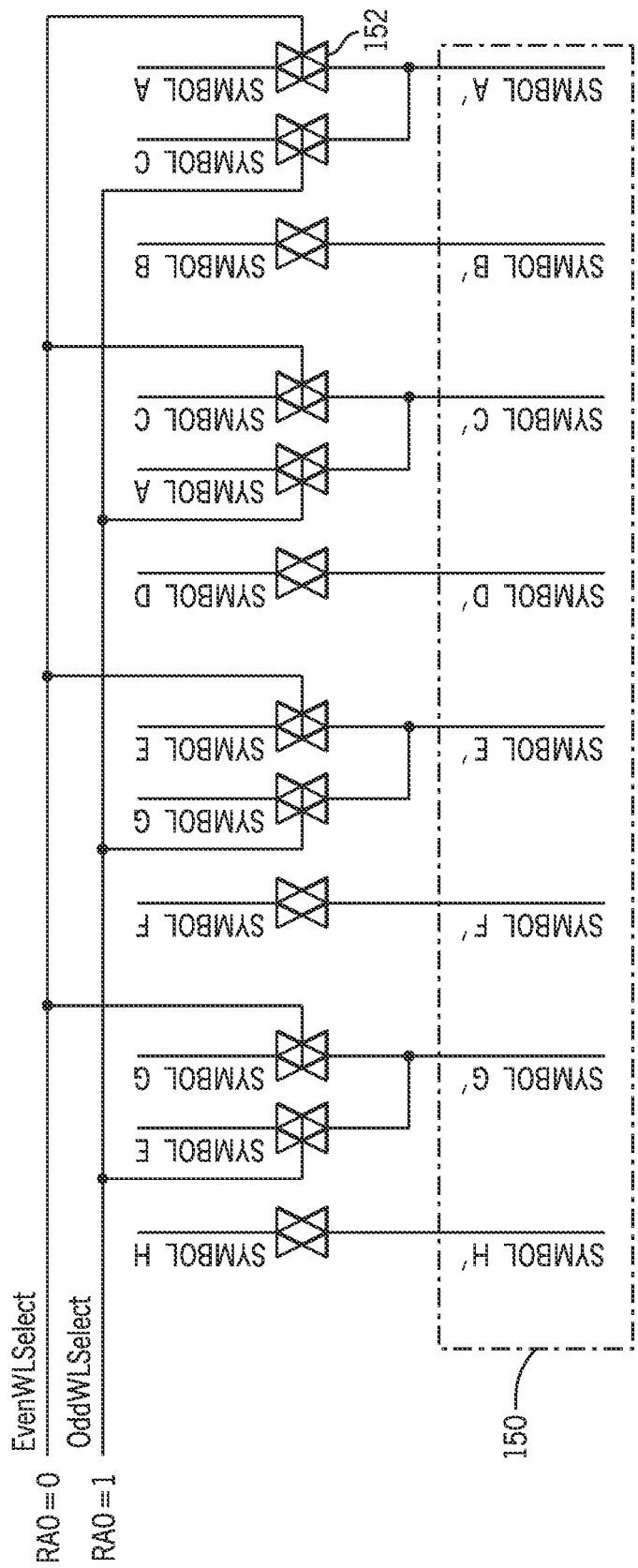
FIG. 11 is a circuit diagram of data routing circuitry corresponding to FIG. 5 symbol mapping, in accordance with an embodiment.

FIG. 11 is a circuit diagram of data routing circuitry corresponding to FIG. 5 symbol mapping. Similar to FIG. 10, a state of row address signal RA0 is used to select a subset of symbols, or row planes 80, for access to improve correctability of potential data errors. For example, using RAO to select symbols from the array to be output in such a way that makes physical SWL Driver defects more likely to be repairable when correction code restriction can only correct multi-symbol errors if the errors happen in Symbols (A' and B') or (C' and D') or (E' and F') or (G' and H'), where ' indicates the data path version of the symbols. For example, the state of RA0 may be used toggle communication from the memory bank 12 to the data path 100 of symbol G' between symbol E and symbol G corresponding to row plane 80D shown in FIG. 5. Other selection operations also apply to toggle the data path of symbols A', C', and E' between the different row planes 80 but are skipped for clarity of description. Data path symbols H', F', D', and B' may not switch between symbols in response to the state of RA0. It is noted that similar circuitry may be used with FIG. 6 embodiments to selectively route data between different portions of the memory bank 12.

Thus, with the foregoing in mind, these systems and methods may consider ECC operational limits to correction when generating DQ symbol maps to reduce a likelihood of uncorrectable data errors occurring. The following is a non-exhaustive discussion of example ECC operation processing limitations which may be considered by control logic 48 or other suitable control circuitry when operating the switching logic circuitry and/or data path circuitry 46 to route data between the memory banks 12 and the I/O interface 16.

As described above, some error correction operations may correct data errors that belong to certain symbol groupings. For example, if two symbols output data with data errors, then data errors corresponding to those two symbols may be corrected if the two symbols are (A and B) or (C and D) or (E and F) or (G and H). For example, if symbol A and C are associated with a memory defect that causes the retrieval of their data to misoperate, the correction algorithm is unable correct the data. Therefore, symbols that share a SWL driver should be assigned such that when grouped together as pair greater correctability may be achieved. For example, a data path assignment that groups symbol A and symbol B as a pair sharing a same SWL driver 64 may be relatively more correctable than a data path assignment that groups symbol A and symbol C, symbol A and symbol D, symbol A and symbol E, or the like, as a pair sharing a same SWL driver 64.

There are many ways to create correctability rules. Assigning symbol pairs based on the hypothetical correctability of the pair (e.g., assigning symbols as pairs when correctable, not assigning symbols as pairs when uncorrectable) is one example to show that having advanced knowledge of common correctable groupings may be used to organize data. Indeed, advanced knowledge of correctability may enable data routing assignments in such a way as to avoid relatively more common array defects from causing uncorrectable error combinations. It is noted that although described in terms of row planes, the isolation operations and combination may be similarly applied to a memory bank using column planes, like the memory bank 12A with column planes 60, and vice versa.

Furthermore, there may be some embodiments where the control logic 48 performs processing operations to generate DQ symbol maps based on an indication of one or more non-correction conditions. The operations may include receiving an original DQ symbol map and performing a first compliance analysis to obtain a metric indicative of a number of non-correction conditions present within the DQ symbol map. If the number of non-correction conditions present is less than a threshold value, the control logic 48 may proceed with using that map. However, if the number of non-correction conditions present is greater than or equal to a threshold value, the control logic 48 may, using the indications of the non-correction conditions, adjust how row planes 80 and/or column planes 60 are assigned within the DQ symbol map to avoid or reduce a likelihood of the non-correction conditions occurring. After adjusting the DQ symbol map, the control logic 48 may repeat evaluating the changes to determine if fewer non-correction conditions are present and/or whether the number of non-correction conditions present are less than the threshold number.

Accordingly, the technical effects of the present disclosure include systems and methods for reducing a likelihood of uncorrectable data errors from occurring without also increasing expected or actual error rates. These systems and methods describe switching logic circuitry that may route data between memory and an I/O interface in such a way as to structurally isolate DQ symbol paths from each other. Indeed, pairs of DQ symbol paths may produce uncorrectable data errors when an ECC operation is unable to correct the data error. Certain conditions may cause the ECC operation to be unable to correct the data error, such as a number of data errors or a placement of the data errors. By the switching logic circuitry and/or control circuitry considering the conditions when generating or employing a DQ symbol map, a pairing that may otherwise yield uncorrectable data errors may be mitigated and rerouted to avoid the condition uncorrectable by the ECC operation. Thus, these systems and methods may prevent or reduce a likelihood of certain uncorrectable error combinations from occurring without also increasing expected or actual error rates.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A device, comprising:
a memory bank comprising a plurality of planes;
bank control circuitry comprising a plurality of sub-wordline drivers, wherein each of the sub-wordline drivers is associated with subsets of the plurality of planes; and
data path circuitry comprising a plurality of bi-directional data paths, wherein the data path circuitry is configured to couple one or more bi-directional data paths of the plurality of bi-directional data paths to one or more sub-wordline drivers of the plurality of sub-wordline drivers based at least in part on one or more control signals, wherein the bank control circuitry is configured to generate the one or more control signals to change an assignment of a respective bi-directional data path of the plurality of bi-directional data paths to one or more other sub-wordline drivers of the plurality of sub-wordline drivers based at least in part on error correction code (ECC) operations.

2. The device of claim 1, wherein a bi-directional data path map (DQ symbol map) comprises the assignment, and wherein the assignment is based on a non-correction condition associated with the ECC operations.

3. The device of claim 1, wherein the plurality of bi-directional data paths comprises a first bi-directional data path logically adjacent to a second bi-directional data path, and wherein a first sub-wordline driver of the plurality of sub-wordline drivers is configured to provide data access to the first bi-directional data path at a first time and to the second bi-directional data path alternatingly at a second time.

4. The device of claim 3, wherein the first sub-wordline driver is configured to provide the data access at the first time in response to a column select address signal.

5. The device of claim 3, wherein the first sub-wordline driver is configured to provide the data access at the first time and at the second time in response to different row select addresses.

6. The device of claim 1, wherein the assignment is configured to change between a first assignment and a second assignment in response to a bank activation address.

7. The device of claim 6, wherein the plurality of bi-directional data paths comprises a first bi-directional data path adjacent to a second bi-directional data path, and wherein the first assignment is configured to cause the data path circuitry to associate the first bi-directional data path and the second bi-directional data path with a first sub-wordline driver of the plurality of sub-wordline drivers in response to a first bank activation address.

8. The device of claim 7, wherein the second assignment is configured to cause the data path circuitry to associate the first bi-directional data path and the second bi-directional data path with a second sub-wordline driver of the plurality of sub-wordline drivers in response to a second bank activation address.

9. The device of claim 1, wherein the plurality of planes comprises a plurality of row planes, wherein the the assignment is configured to associate a respective bi-directional data path of the plurality of bi-directional data paths with a respective row plane of the plurality of row planes, and wherein the the assignment is selected in response to a bank activation address.

10. The device of claim 9, wherein control circuitry of the data path circuitry is configured to program the assignment via a plurality of multiplexers.

11. A method, comprising:
receiving an indication of a non-correction condition associated with error correction code (ECC) stored in a memory bank, wherein the ECC is configured to correct one or more data errors of output data, and wherein the one or more data errors are uncorrectable by the ECC when the non-correction condition is met;
generating data path assignments based at least in part on the indication of the non-correction condition;
generating control signals based on the data path assignments; and
transmitting the control signals to data path circuitry, wherein the data path circuitry is configured to associate a respective bi-directional data path to at least two respective sub-wordline drivers in response to the control signals.

12. The method of claim 11, wherein transmitting the control signals causes the data path circuitry to reroute a bi-directional data path from a first sub-wordline driver of an edge data plane to a second sub-wordline driver of an interior data plane to avoid causing the non-correction condition.

13. The method of claim 11, comprising generating the data path assignments based at least in part on the indication of the non-correction condition and at least in part by adjusting an original data path assignment to avoid causing the non-correction condition.

14. The method of claim 11, wherein the non-correction condition is associated with a first pair of bi-directional data paths corresponding to a first shared sub-wordline driver with a logical arrangement that is adjacent, a second pair of bi-directional data paths corresponding to a second shared sub-wordline driver with a logical arrangement that crosses a nibble boundary, or both.

15. A device, comprising:
bank control circuitry comprising a plurality of sub-wordline drivers, wherein each of the plurality of sub-wordline drivers is associated with a memory bank; and
a plurality of bi-directional data paths configured to couple between the plurality of sub-wordline drivers and input/output (I/O) interface circuitry based at least in part on an indication of an assignment of each bi-directional data path of the plurality of bi-directional data paths to one or more sub-wordline drivers of the plurality of sub-wordline drivers, wherein the assignment is configured to be generated based at least in part on error correction operations performed on data of the memory bank.

16. The device of claim 15, wherein the assignment is configured to be generated based at least in part on the error correction operations by control circuitry performing operations comprising:
  receiving an indication of a non-correction condition associated with error correction code (ECC) stored in the memory bank, wherein the ECC is configured to perform the error correction operations to correct one or more data errors of output data, and wherein the one or more data errors are uncorrectable by the ECC when the non-correction condition is met; and
  generating the assignment based at least in part on the indication of the non-correction condition.

17. The device of claim 15, comprising control circuitry configured to:
  generate one or more control signals based on the assignment; and
  transmit the control signals to switching logic circuitry corresponding to the plurality of bi-directional data paths, wherein the switching logic circuitry is configured to associate a respective bi-directional data path to at least two respective sub-wordline drivers in response to the control signals.

18. The device of claim 15, wherein the indication of the assignment comprises a first assignment when a bank activation bit has a logical high state, and wherein the indication of the assignment comprises a second assignment when the bank activation bit has a logical low state.

19. The device of claim 18, wherein the memory bank comprises eight row planes, wherein the first assignment is configured to associate each of eight row planes with each of the plurality of bi-directional data paths, and wherein a portion of the first assignment applies to both when the plurality of bi-directional data paths comprises four bi-directional data paths and comprises eight bi-directional data paths.

20. The device of claim 15, comprising:
  the memory bank comprising a plurality of row planes; and
  data path circuitry comprising the plurality of bi-directional data paths and multiplexing circuitry, wherein the data path circuitry transmits data between the plurality of row planes and the I/O interface circuitry at least in part by transmitting control signals based at least in part on the assignment to the multiplexing circuitry.

* * * * *